US012558660B2

(12) United States Patent
Minne et al.

(10) Patent No.: US 12,558,660 B2
(45) Date of Patent: Feb. 24, 2026

(54) REACTOR FOR THE CATALYTIC TREATMENT OF A GAS STREAM

(71) Applicants: thyssenkrupp Industrial Solutions AG, Essen (DE); thyssenkrupp AG, Essen (DE)

(72) Inventors: Pascal Minne, Dortmund (DE); Horst Honecker, Luenen (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 729 days.

(21) Appl. No.: 17/802,098

(22) PCT Filed: Feb. 25, 2021

(86) PCT No.: PCT/EP2021/054751
§ 371 (c)(1),
(2) Date: Aug. 24, 2022

(87) PCT Pub. No.: WO2021/170756
PCT Pub. Date: Sep. 2, 2021

(65) Prior Publication Data
US 2023/0356163 A1 Nov. 9, 2023

(30) Foreign Application Priority Data

Feb. 25, 2020 (BE) ................................... 2020/5120
Feb. 25, 2020 (DE) .................... 10 2020 202 387.5

(51) Int. Cl.
| | |
|---|---|
| *B01J 8/02* | (2006.01) |
| *B01D 53/86* | (2006.01) |
| *B01J 8/04* | (2006.01) |

(52) U.S. Cl.
CPC .......... *B01J 8/025* (2013.01); *B01D 53/8631* (2013.01); *B01J 8/0453* (2013.01); *B01D 2257/404* (2013.01); *B01J 2208/00884* (2013.01)

(58) Field of Classification Search
CPC ........ B01D 53/00; B01D 53/34; B01D 53/74; B01D 53/86; B01D 53/8621;
(Continued)

(56) References Cited

U.S. PATENT DOCUMENTS 5,891,405 A 4/1999 Bianchi et al.
9,364,810 B2 * 6/2016 Merkel .................... D04B 1/14
(Continued)

FOREIGN PATENT DOCUMENTS

DE 102 26 461 A1 1/2004
EP 0 771 234 A1 5/1997
(Continued)

OTHER PUBLICATIONS

English Translation of International Search Report issued in PCT/EP2021/054751, dated May 6, 2021.

*Primary Examiner* — Natasha E Young
(74) *Attorney, Agent, or Firm* — thyssenkrupp North America, LLC

(57) ABSTRACT

A reactor may have a catalyst bed for the catalytic treatment of a gas stream, with the catalyst bed extending substantially over a cross section of the reactor. Gas to be treated may axially fly through the catalyst bed. A carrier structure for the catalyst bed that is at least partly floatingly mounted in the reactor may include a sieve element and, radially outwardly, carrier elements fixedly joined to the reactor wall below the sieve element. The sieve element provides a resting surface for the catalyst bed. The sieve element terminates, radially outwardly, at a distance from the reactor wall. The carrier
(Continued)

structure also includes support elements for the sieve element that are floatingly mounted in the reactor. An improved floating mounting is thus provided where not only the sieve element itself but also further parts of the carrier structure are mounted to prevent stresses due to thermal expansion.

20 Claims, 4 Drawing Sheets

(58) Field of Classification Search
CPC ............ B01D 53/8625; B01D 53/8631; B01D 2257/00; B01D 2257/40; B01D 2257/402; B01D 2257/404; B01J 8/00; B01J 8/008; B01J 8/02; B01J 8/0207; B01J 8/0242; B01J 8/025; B01J 8/04; B01J 8/0446; B01J 8/0449; B01J 8/0453; B01J 8/18; B01J 8/24; B01J 8/44; B01J 2208/00; B01J 2208/00796; B01J 2208/00884; B01J 2208/02; B01J 2208/023; B01J 2208/024; B01J 2219/00; B01J 2219/32; B01J 2219/324; B01J 2219/32425; C01B 21/00; C01B 21/20; C01B 21/24; C01B 21/26; C01B 21/28; Y02C 20/00; Y02C 20/10; Y02P 20/00; Y02P 20/151
See application file for complete search history.

(56) References Cited

U.S. PATENT DOCUMENTS

| | | | |
|---|---|---|---|
| 2003/0143142 A1 | 7/2003 | Schwefer et al. |
| 2006/0051277 A1 | 3/2006 | Schwefer et al. |
| 2014/0363359 A1 | 12/2014 | Schwefer et al. |
| 2018/0243714 A1 | 8/2018 | Thielert et al. |

FOREIGN PATENT DOCUMENTS

| | | | |
|---|---|---|---|
| EP | 1 268 040 B1 | 1/2003 |
| WO | 02/070120 A1 | 9/2002 |
| WO | 2012/065969 A1 | 5/2012 |
| WO | 2018/137996 A1 | 8/2018 |

* cited by examiner

REACTOR FOR THE CATALYTIC TREATMENT OF A GAS STREAM

CROSS REFERENCE TO RELATED APPLICATIONS

This application is a U.S. National Stage Entry of International Patent Application Serial Number PCT/EP2021/054751, now WO 2021/170756, filed Feb. 25, 2021, which claims priority to German Patent Application No. DE 10 2020 202 387.5, filed Feb. 25, 2020, and Belgian Patent Application No. BE 2020/5120, filed Feb. 25, 2020, the entire contents of all of which are incorporated herein by reference.

FIELD

The present disclosure generally relates to reactors, including reactors for the catalytic treatment of gas streams.

BACKGROUND

The production of nitric acid is one of the established processes of chemical engineering which after introduction of the Haber-Bosch process for $NH_3$ synthesis was developed to a state of industrial maturity by W. Ostwald on the basis of platinum catalysts and whose concept still forms the basis of modern $HNO_3$ production even today.

To produce nitric acid ammonia $NH_3$ is initially reacted with air to produce nitric oxide NO which is then oxidized to afford nitrogen dioxide $NO_2$.

The thus-obtained nitrogen dioxide $NO_2$ is subsequently absorbed in water to form nitric acid. In order that the greatest possible amount of produced nitrogen dioxide $NO_2$ is absorbed by water, the absorption is generally carried out at elevated pressure, preferably at pressures between about 4 and about 14 bar.

In nitric acid production, ammonia is thus combusted in the air in the presence of platinum meshes. The meshes are flown through by a gas mixture composed of typically about 9-12 vol % of $NH_3$ and air, a temperature of about 800-950° C. being established at the meshes as a result of the exothermicity of the oxidation reaction. $NH_3$ is oxidized to very selectively afford nitrogen monoxide (NO) (A, reaction scheme I) which is then oxidized in the course of the further process to afford nitrogen dioxide ($NO_2$) (B, reaction scheme II) and finally reacted with water in an absorption apparatus to afford $HNO_3$ (C, reaction scheme III).

A) Combustion of ammonia in an oxidation reactor for reaction of ammonia with oxygen to afford nitric oxide $$4NH_3+5O_2 \rightarrow 4NO+6H_2O \tag{I}$$

B) Oxidation of nitrogen monoxide to afford nitrogen dioxide $$2NO+O_2 \rightarrow 2NO_2 \tag{II}$$

In the Ostwald nitric acid process, this reaction proceeds as an uncatalyzed gas phase reaction.

C) Formation of $HNO_3$ (nitric acid) by absorption of $NO_2$ in water in the condensers and the absorption tower with reformation of NO $$3NO_2+H_2O \rightarrow 2HNO_3+NO \tag{III}$$

A typical process and a plant for production of nitric acid are described, for example, in WO 2018/137996 A1.

The inventive plant comprises an ammonia oxidation reactor to which ammonia is supplied via a conduit. In this ammonia oxidation reactor, ammonia is catalytically oxidized to nitrogen oxides (NOx) using atmospheric oxygen. The oxidation of the ammonia is carried out catalytically at high temperatures of for example about 900° C., wherein the ammonia is initially oxidized to nitrogen monoxide (NO) and then, after temperature reduction, to nitrogen dioxide ($NO_2$). The NOx-containing product gas produced in the ammonia oxidation reactor is then supplied to an acid condenser in which a cooling is carried out, so that water present in the product gas stream condenses to form a first proportion of acid condensate with the NOx gas which is supplied to an absorption tower in which the NOx gases are absorbed in water to form nitric acid ($HNO_3$). The residual gas (so-called tail gas) exits the absorption tower at the top and is then supplied to a residual gas reactor which is also supplied with ammonia which reacts with the nitrogen oxides remaining in the residual gas to afford nitrogen and water, so that the residual gas is freed of NOx and purified.

Processes for removing NOx and $N_2O$ from the residual gas from nitric acid production are described, for example, in EP 1 268 040 B1. The process may comprise for example two successive stages, wherein in the first stage, which is also known in the art as the DeNOx stage, the NOx content is reduced by a catalytic reduction process and in the second stage (also known as the $DeN_2O$ stage) the $N_2O$ content of the gas is reduced. In the first stage, the reduction of the nitrogen oxides may be effected with ammonia for example by the following reaction equations:

$$6NO_2+8NH_3 \rightarrow 7N_2+12H_2O \tag{IV}$$

$$4NO+O_2+4NH_3 \rightarrow 4N_2+6H_2O \tag{V}$$

In the second stage, the $N_2O$ initially reacts with NO according to the following equation:

$$2N_2O+NO \rightarrow 2N_2+2NO_2 \tag{VI}$$

$$2NO_2 \leftrightarrow 2NO+O_2 \tag{VII}$$

What is concerned here is thus altogether a catalytic decomposition of the $N_2O$ to $N_2$ and $O_2$ according to the overall equation $$2N_2O \rightarrow 2N_2+O_2 \tag{VIII}$$

The NOx reduction in the treatment of the residual gas exiting the absorption tower in the production of nitric acid has hitherto primarily employed reactors having catalyst beds that are flown through radially. These reactors have a great many disadvantages: A reactor flown through radially is provided with an internal catalyst basket which is generally made of sieve plate and wire mesh. This basket necessitates an expensive, complex, and fault-prone apparatus main flange. Furthermore, the basket including catalyst must be held by a solid inner carrying ring, which in turn necessitates inner machined sealing surfaces. Manufacturing cost and complexity, and susceptibility to faults, must be regarded as very high.

Furthermore, settling of the catalyst bed occurs in a catalyst basket which is flown through radially. In order to avoid bypassing of the gas stream above the catalyst bed an allowance must always be made for a settling reserve of the costly catalyst which may be for example up to 25% of the total catalyst volume and does not take part in the actual catalytic reaction.

Furthermore, the removable catalyst basket fulfills the task for which it was conceived, namely simple replacement of the catalyst, only inadequately. Due to its design, the basket cannot be 2.5 tipped out since it is merely made of thin perforated plate. To effect replacement the catalyst must therefore be removed from the basket by suction in any case.

DE 102 26 461 A1 discloses a process for producing nitric acid, where in order to reduce the content of nitrogen oxides (NO, $NO_2$ and $N_2O$) the offgas from nitric acid production is passed through two consecutive catalyst beds, wherein one or both catalyst beds are radially flown through by the offgas to be purified. In this known apparatus the catalyst beds do not extend over the entire cross section of the vessel but rather an annular gap remains between the catalyst bed and the container wall, and so the gas to be purified enters this annular gap and flows from there radially inwards through a first catalyst bed, then passes into a radially inner annular gap, through which it flows in axial direction, and subsequently flows through a second catalyst bed in turn in the radial direction from inside to outside. This manner of flowing through a catalyst bed is in the present application referred to as radial flow through the catalyst bed relative to the reactor.

If, on the other hand, the gas to be purified passes through a catalyst bed extending substantially over the entire cross section of the reactor in the axial or axis-parallel direction this is referred to in the present invention as axial flow through the catalyst bed. However, the latter type of flowing trough the catalyst bed may relate to both, vertical or horizontal vessels. In the latter case, the catalyst bed may also extend over the entire longitudinal extent of the vessel, wherein said vessel may have larger dimensions in the longitudinal direction than in the vertical direction and so in the case of a horizontal cylindrical vessel the flow direction relative to the reactor vessel is transverse to the axis thereof. This is also an axial flow through the catalyst bed in the context of the present invention even if the horizontal cylindrical vessel itself is radially flown through in this case.

WO 2012/065969 A1 discloses a chemical reactor with knitted wire mesh as a retaining means for particles of a catalyst bed having the features recited at the outset, wherein the chemical reactor is used for the heterogeneously catalyzed reaction of a fluid, and wherein the catalyst bed is flown through in the axial direction relative to the reactor. The inside of the reactor wall features a circumferential carrying ring. Floatingly mounted on this carrying ring is a carrier in the form of a slot sieve, on which is arranged, in turn, a knitted wire mesh which accommodates the catalyst particles. The heterogeneously catalyzed reaction is an adiabatic hydrogenation of nitrobenzene to aniline.

EP 0 771 234 B1 describes a reactor for exothermic heterogeneous catalytic synthesis reactions, in particular for the production of ammonia or methanol, where the catalyst bed substantially fills the entire cross section of the reactor and is flown through by the reaction gases in the axial direction relative to the vessel. The reactor comprises a base plate which radially inwardly is floatingly mounted on a carrier and which outwardly is mounted on a ring-shaped carrier, and there extends to close to the wall of the reactor. The base plate supports the catalyst bed. The floating mounting on one side avoids stresses due to thermal expansion.

Thus a need exists for a reactor having at least one catalyst bed for the catalytic treatment of a gas stream, in particular for residual gas treatment in the production of nitric acid, having the abovementioned features, in which the catalyst bed is axially flown through and a floating mounting for the catalyst bed having an improved construction is provided.

DETAILED DESCRIPTION

Figures 1, 2:
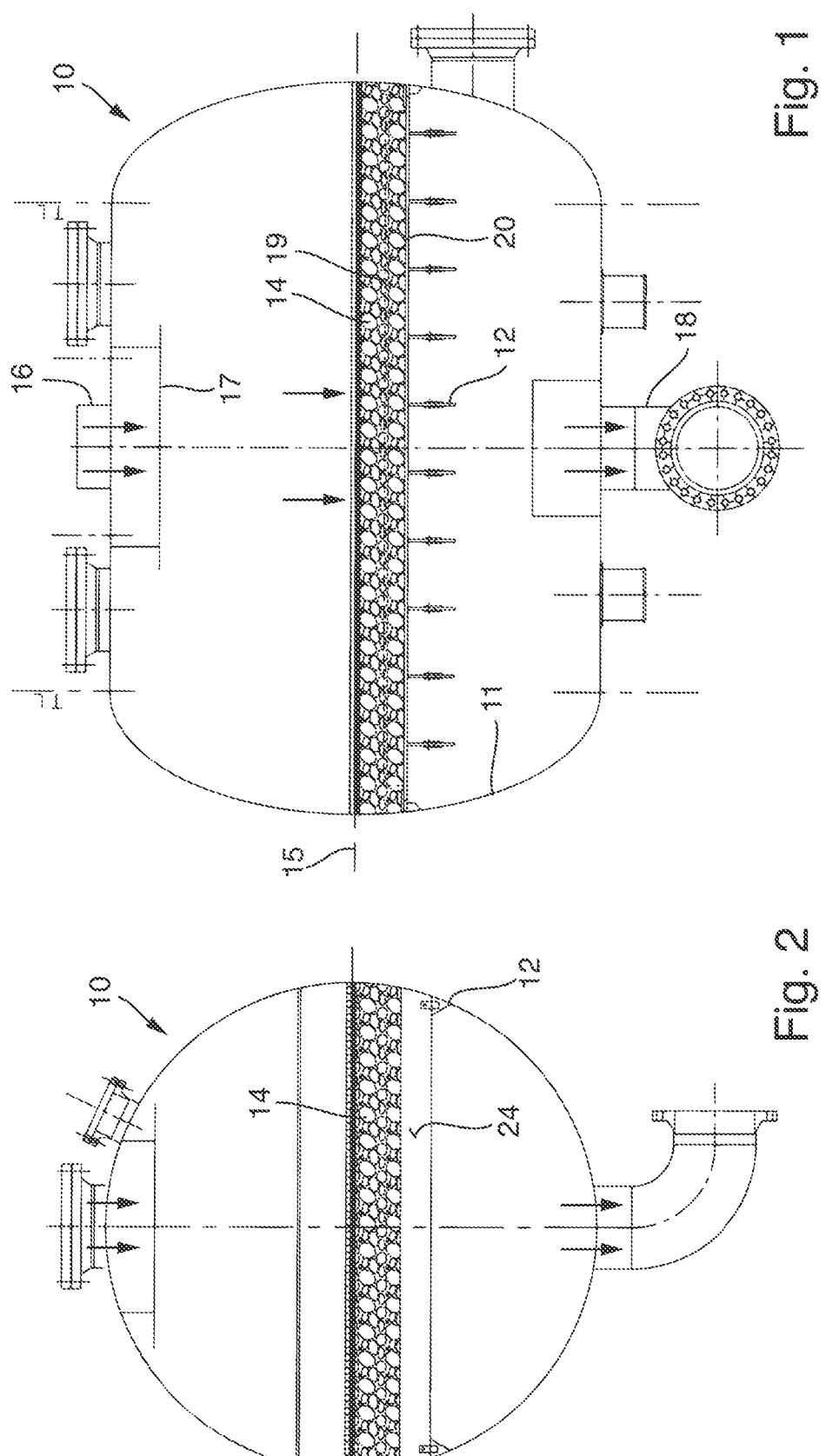
FIG. 1 is a schematically simplified longitudinal sectional view through an example residual gas reactor of a plant for producing nitric acid according to an exemplary embodiment of the present disclosure.
FIG. 2 is a schematically simplified cross-sectional view through the residual gas reactor according to the exemplary embodiment of FIG. 1.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a reactor may have at least one catalyst bed for the catalytic treatment of a gas stream, in particular a reactor for the catalytic treatment of residual gas for reducing the content of nitrogen oxides in processes for producing nitric acid by the Ostwald process, wherein the catalyst bed extends substantially over the cross section of the reactor and the catalyst bed is axially flown through by the gas to be treated, wherein the reactor comprises a carrier structure for the catalyst bed which is at least partly floatingly mounted in the reactor, wherein the carrier structure comprises a sieve element and, radially outwardly, carrier elements fixedly joined to the reactor wall below the sieve element, wherein the sieve element provides a resting surface for the catalyst bed and wherein the sieve element terminates, radially outwardly, at a distance from the reactor wall.

According to the invention, it is provided that the carrier structure comprises not only carrier elements fixedly joined the reactor wall but also support elements for the at least one sieve element which are likewise floatingly mounted in the reactor. The solution according to the invention provides that not only the (flat) sieve element, but also the support elements on which regions of the sieve element rest are floatingly mounted.

A particular advantage of the solution according to the invention is that, compared to the conventional construction having an upright reactor vessel and a catalyst bed flown through radially, the costly main apparatus flange may be omitted. The complex and costly reactor basket may also be omitted. This reduces the costs of the apparatus and delivery times. The amount of catalyst required can also be reduced since a settling reserve is no longer needed. The spent catalyst is easier to replace, for example by suction, and access to the interior of the vessel and thus to the catalyst may be effected via manholes. This eliminates the previous time-consuming disassembly of the reactor cap and removal of the reactor basket. The procedure of replacing the catalyst is thus markedly simplified. The size of the apparatus may be adapted to the catalyst bed required in a particular case, virtually at will. The apparatus may be produced in a shorter time and at lower costs and maintenance of the plant is simplified.

Some of the terms used herein shall be elucidated again below for better understanding of the present description of the invention.

The term "nitrogen oxides" is used in the art as an umbrella term for the oxides of the various oxidation states formed in the oxidation reaction of ammonia, namely nitrogen monoxide (NO), nitrogen dioxide ($NO_2$), dinitrogen tetroxide ($N_2O_4$) and dinitrogen monoxide ($N_2O$), although the reaction forms primarily NO and $NO_2$. These various nitrogen oxides are also collectively referred to as NOx. In the step of absorption of the nitrogen oxides in water, which is carried out in the absorption tower of a nitric acid plant, according to the above equation C) nitrogen dioxide ($NO_2$), where the nitrogen is in the oxidation state 4, is further oxidized to nitric acid ($HNO_3$), where the nitrogen is in the oxidation state 5.

This reaction of the absorption of nitrogen dioxide in water is carried out in an absorption tower, wherein this is an absorption column comprising a plurality of sieve trays and a sump in its lower region. The term "residual gas" refers to the gas which is not converted into liquid nitric acid in the absorption but rather exits the absorption tower in gaseous form. In the residual gas purification, this residual gas is generally catalytically reduced to nitrogen by reaction with ammonia to reduce the content of nitrogen oxides (NOx and $N_2O$) in the residual gas. This residual gas is also referred to as "tail gas" in the anglosphere.

The reactor according to the invention is used in particular for the treatment of the residual gas exiting the absorption tower during nitric acid production.

The term "sieve element" used here is to be understood as meaning a flat, plate-like construct which is perforated and thus gas-permeable. This may be for example a sieve plate which preferably extends both in the longitudinal direction and in the transverse direction through the entire residual gas reactor below the catalyst bed and thus serves as a resting surface for the catalyst bed. The sieve element may be continuous over its area or optionally composed of two or more smaller sieve elements. Since it is thus possible in principle to employ two or more sieve elements which combine to form the overall area of the sieve element, the present application also refers to at least one sieve element.

The term "carrier structure" is used here to refer to all of the components that serve to establish a resting surface for the catalyst bed. This carrier structure comprises the sieve element, the support elements on which the sieve element rests, the brackets on which in turn these support elements rest and optionally further carrier elements on the wall of the reactor vessel on which the edge region of the sieve element rests.

The present invention thus comprises reactors in the form of horizontal reactors where the gas stream, in particular the residual gas, flows though the catalyst bed substantially perpendicularly or transversely to the vessel axis or in the form of vertical reactors where the gas stream, in particular the residual gas, flows through the catalyst bed substantially in the axis direction or parallel to the vessel axis. The horizontal reactor is preferably and approximately cylindrical vessel whose axis is approximately horizontal, wherein the extent of the vessel in this axis direction is also referred to as the longitudinal direction while the extent of the vessel transverse to its longitudinal axis, i.e. the radial extent relative to its longitudinal axis, is also referred to as the transverse direction. In a horizontal reactor vessel, the catalyst bed extends substantially horizontally as a layer over preferably the entire cross section of the vessel and is axially flown through by the gas stream to be purified, i.e. from top to bottom or optionally in the opposite direction from bottom to top.

If settling of the catalyst occurs at all in the reactor according to the invention, this is unproblematic since the axial through-flow has the result that no bypassing occurs since the process gas cannot flow past the side of the catalyst bed.

The filling/emptying of the catalyst, in particular by suction, may be realized for example via a wide variety of manholes and filling ports, wherein the number and positioning depend on the size and geometry of the reactor vessel in the particular application. A separate catalyst basket is no longer required, thus eliminating the need for a costly and complex apparatus main flange.

Catalyst beds which are axially flown through have hitherto hardly been used in this field due to thermal stress problems. The horizontally arranged catalyst bed must be appropriately supported in the reactor vessel. In order to prevent bypassing between the vessel wall and the catalyst bed, the construction has hitherto needed to be fixedly welded to the vessel shell. The temperatures typically occurring during operation thus in turn lead to high thermal stresses and thus to damage to the catalyst bed or its supports (the carrier structure). This is prevented by the improved floating mounting according to the invention.

In a preferred development of the invention the carrier elements fixedly joined to the reactor wall comprise brackets on which the support elements displaceably rest, wherein the at least one sieve element in turn rests on the displaceable support elements. Brackets are presently to be understood as meaning carrier elements shaped such that on the one hand they extend along the optionally curved reactor wall to which they are joined and on the other hand comprise on their top surface a preferably horizontal resting surface on which the support elements can rest. In side view, such brackets may have a for example an approximately triangular outline, wherein one side of the triangle, which extends along the reactor wall, has a convex curve. The resting forces composed of the weight force of the sieve element and the catalyst bed are in this way advantageously transmitted into the reactor wall and a lever moment is avoided.

Preferably, two or more brackets are provided which are respectively spaced apart from one another in the longitudinal direction or in the circumferential direction of the reactor, on which support elements displaceably rest in each case, wherein one or more sieve elements rest on one or more support elements. Such brackets may be arranged along the length and along the width of the reactor vessel wall.

In a preferred development of the invention, the support elements displaceably rest on the brackets with two degrees of freedom of motion in two directions approximately perpendicular to one another. This variant has the advantage that expansions of the support elements in the longitudinal direction of the reactor vessel as well as expansions in the transverse direction (transverse to the longitudinal direction) of the reaction vessel are possible without generation of stresses.

In a possible preferred constructional variant of the reactor according to the invention, the brackets are wider in their transverse direction than the support elements. As a result, the support elements on the brackets can be displaced in the transverse direction without stresses occurring in the components.

To prevent such a displacement of the support elements in the transverse direction of the brackets from causing the support elements to slide off the brackets, a preferred development of the invention provides that the brackets have cheeks mounted to them such that they limit the displaceable motion of the support elements relative to the brackets in the transverse direction of the brackets.

The support elements preferably terminate at a distance from the reactor wall so that a gap remains here and no stresses are formed if the support elements undergo expansion in their longitudinal direction, i.e. in the direction towards the reactor wall.

In a preferred development of the invention, in each case two parallel cheeks spaced apart from one another are mounted on both sides of the brackets, wherein the two cheeks are joined to one another via a spacer element extending in the transverse direction. In this preferred constructional variant, the cheeks are not only fixedly joined to the brackets, but also joined to one another. If the support elements are displaced on the brackets in the transverse direction, thus causing forces to act on the cheeks in this direction, the cheeks are stabilized with respect to one another by the join. The spacer element extending in the transverse direction ensures some guidance of the support elements upon displacement thereof in the transverse direction.

In the abovementioned constructional variant a spacer element in the form of a sleeve which is joined to the cheeks by a friction-locked join and which joins the cheeks to one another and which extends transverse (i.e., approximately perpendicular) to the plane of the two parallel cheeks is provided. The join between the sleeve and the two cheeks may be a screw connection for example.

Since the floating mounting of the support elements provides that these can also move on the brackets in the longitudinal direction (due to thermal expansion) the support elements must comprise a slot or an elongate hole when the sleeve running between the cheeks as a spacer element extends transverse to the support element so that the sleeve then extends through the slot, thus ensuring the degree of freedom of motion in the longitudinal direction for the support element.

A preferred development of the present invention provides that the carrier structure comprises not only the brackets but also at least one further carrier element circumferentially arranged at the reactor wall and joined thereto, on which the at least one sieve element floatingly rests at a distance from the reactor wall so that an edge gap between the sieve element and the reactor wall remains. In this possible constructional variant, the sieve element thus displaceably rests on generally two or more of the support elements described above which are spaced apart from one another in the longitudinal direction of the reactor vessel. These support elements each terminate at a distance from the reactor wall. The outer region of the sieve element on the far side of these support elements in the region proximal to the wall then in rests in floating fashion on a further carrier element which may be circumferentially arranged at the wall of the reactor vessel and which is itself fixedly joined to the reactor wall. Due to the mounting being floating here too, the sieve element is also displaceable relative to this further carrier element. The circumferential carrier element prevents bypassing of the gas stream.

In a preferred development of the present invention, at least one circumferential cover plate which covers an edge gap between the sieve element and the reactor wall and prevents the catalysts bed from trickling into the slot between the sieve element and the vessel wall is provided. The cover plate may also be in the form of an angle profile or in the form of a steel sheet mounted to the vessel wall at an angle.

In the abovementioned constructional variant the edge region of the sieve element facing the reactor wall is in principle enclosed by the circumferential further carrier element on which the sieve element, in particular the sieve plate, rests and the cover plate which rests on the sieve plate. The catalyst bed generally does not lie directly on the sieve plate but rather the sieve plate first has a wire mesh placed on it, on which in turn the catalyst bed rests.

In a preferred variant of the invention the reactor is in the form of a horizontal reactor where the gas stream, in particular the residual gas, flows through the catalyst bed substantially perpendicularly or transversely to the vessel axis. However, the reactor may alternatively also be designed as an vertical reactor where the gas stream, in particular the residual gas, flows though the catalyst bed substantially in the axial direction or parallel to the vessel axis. The catalyst bed is axially flown through in both cases. In a first variant, a horizontal catalyst bed is present in a horizontal reactor vessel and the gas stream to be treated flows through the horizontal reactor vessel transversely to the vessel axis, usually from top to bottom. In a second variant a horizontal catalyst bed is likewise present but in a vertical reactor vessel and the gas stream to be treated flows though the vessel in the direction of the vessel axis, likewise usually from top to bottom Catalyst beds which are radially flown through and which are not comprehended by the present invention, are for example a vertical catalyst bed in a vertical vessel in which the gas to be treated initially enters in the axial direction from above but is then deflected and flows through the vertical catalyst bed in the radial direction, for example from the outside inward. A catalyst basket that encloses the catalyst is required for such a design with a catalyst bed flown through radially.

In an optional variant of the invention approximately vertically oriented, approximately vertical stiffening ribs which are spaced apart from one another and extend along the sieve element are used for further stiffening the carrier structure above or optionally alternatively also below the sieve element in the catalyst bed. These stiffening ribs may extend, for example, in the longitudinal direction of the reactor vessel.

In a further embodiment of the invention, at least a first catalyst bed and a second catalyst bed are provided. The catalyst beds are spaced apart from one another, wherein at least a portion of the gas stream flows via a first inlet to the first catalyst bed and wherein at least a portion of the gas stream flows via a second inlet to the second catalyst bed. This allows a possibly increased space requirement due to a vertical configuration of the reactor to be optimally utilized with a plurality of floating, catalyst beds flown through axially.

In a further preferred embodiment of the reactor according to the invention, it is provided that the first inlet and the second inlet are fluidically connected to one another via an inlet manifold.

It is advantageously provided in a further embodiment of the reactor according to the invention that at least a portion of the gas stream is dischargeable from the reactor via a first outlet in the region of the first catalyst bed and that at least a portion of the gas stream is dischargeable from the reactor via a second outlet in the region of the second catalyst bed.

In addition, it may be provided in a further embodiment that the first outlet and the second outlet are fluidically connected to one another via an outlet manifold.

In order to avoid a bypass flow, it is provided in a further preferred embodiment that the first catalyst bed and the second catalyst bed are fluidically separated from one another by a separating element. The separating element, for example a separating plate, prevents the gas flow from being able to flow from the first catalyst bed to the second catalyst bed. Accordingly at least two parallel flow paths are provided within the reactor. The first flow path extends from the first inlet through the first catalyst bed to the first outlet. The second flow path extends from the second inlet through the second catalyst bed to the second outlet.

The following refers initially to FIG. 1 and a first exemplary variant of the invention is more particularly elucidated with reference to this illustration. The representation of the reactor in FIG. 1 is a simplified schematic diagram and only the plant components that are relevant in the context of the present invention are shown. FIG. 1 shows a possible alternative variant of the reactor according to the invention which is a horizontal reactor. This means that the axis 15 of the reactor vessel 10 is substantially horizontal and the catalyst bed 14 in principle extends in the direction of this axis or parallel thereto. FIG. 1 shows the catalyst bed 14 which extends in the longitudinal direction (axis direction) of the reactor vessel 10, generally over its entire length. Since the gases to be purified flow into the vessel at the top via the first inlet 16 and flow through said vessel perpendicular to its axis 15 the catalyst bed 14 is flown through by the gases axially in the arrowed direction. In the upper region of the reactor interior, the gases impact a deflection plate 17 so that they are more uniformly distributed over the vessel cross section. The gases then flow axially in the arrowed direction through the catalyst bed and then exit the vessel via the first outlet 18.

Stiffening ribs 19, which in the illustration according to FIG. 1 lie in the catalyst bed, extend in the longitudinal direction in the reaction vessel 10 above a sieve plate 20 on which the catalyst bed 14 rests.

FIG. 2 shows a simplified schematic cross section through the reactor vessel 10 of FIG. 1 from which it is apparent that the reactor vessel 10 has an approximately cylindrical shape and that the catalyst bed 14 also extends over the entire cross section of the reactor when viewed in the transverse direction of the reactor vessel 10, so that the gases to be purified must flow through the catalyst bed. Further details of the carrier structure for resting the sieve plate, on which catalyst bed in turn rests, are apparent from the detail illustrations of FIGS. 3 and 4, which are referred to below.

Figure 3:
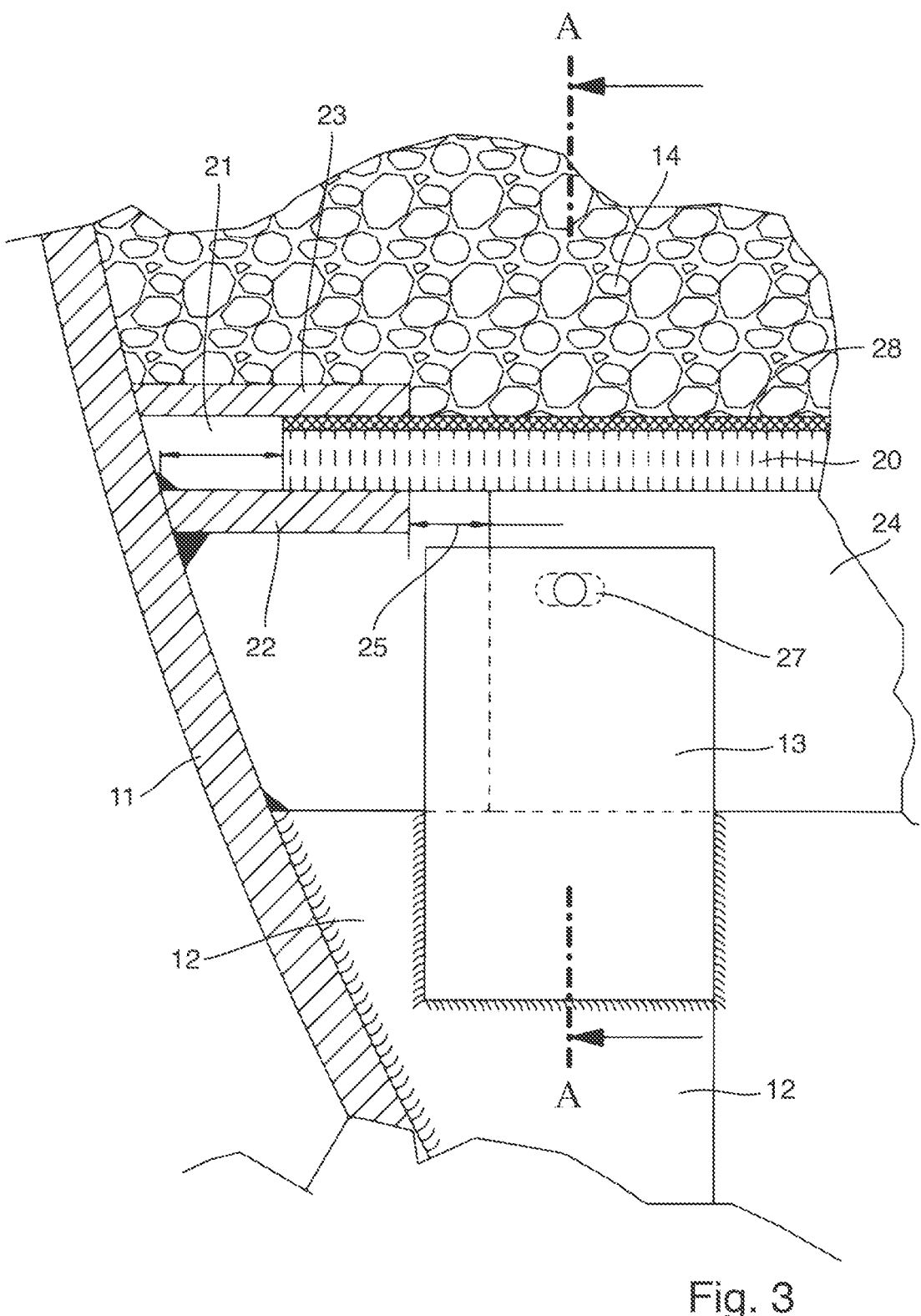
FIG. 3 is an enlarged detail view showing part of a cross section through the residual gas reactor, with a floating mounting of a sieve plate being shown.

FIG. 3 shows a detail view of a cross-sectional illustration of the reactor vessel, similar to that in FIG. 2, but on an enlarged scale. This view shows parts of the carrier structure for the floating mounting of the sieve plate 20 in the reactor vessel 10. This sieve plate 20 on which the catalyst bed 14 rests terminates at a slight distance to the reactor wall 11 so that an edge gap 21 between the outer edge of the sieve plate 20 and the reactor wall 11 remains, wherein the sieve plate 20 in its outer edge region floatingly rests at a distance from the reactor wall on a carrier element 22 circumferentially arranged at the reactor wall and joined, for example welded, thereto. This makes it possible for the perforated plate to be displaced further into the gap 21 in the event of thermal expansion without material stresses occurring. Also provided is at least one circumferential cover plate 23 which covers the edge 21 between the sieve plate 20 and the reactor wall 11, thus preventing the catalyst bed from trickling into the slot between the sieve element and the vessel wall. The edge region of the sieve plate 20 is thus sandwiched between the circumferential carrier element 22 and the cover plate 23. The circumferential carrier element 22 may be a flat iron or the like for example.

The carrier structure for the sieve plate 20 further comprises support elements 24 on which the underside of the sieve plate 20 rests, wherein the support elements 24 are likewise floatingly mounted and terminate at a distance from the circumferential carrier element 22 as indicated by the double arrow 25 in FIG. 3. This makes it possible for the support elements 24 to move in the direction of the double arrow 25, i.e. in the transverse direction, in the reactor vessel 10 in the event of thermal expansion. The carrier structure for the sieve plate 20 also comprises brackets 12 which are firmly joined to the wall 11 of the reactor vessel 10, for example by welding, and on which the support elements 24 are in turn floatingly mounted. A limiting of the transverse displacement of the support elements 24 is ensured by cheeks 13 which comprise a slot 27 or an elongate hole, through which a sleeve 26 extends in the transverse direction to the cheeks 13 (see FIG. 4).

Figure 4:
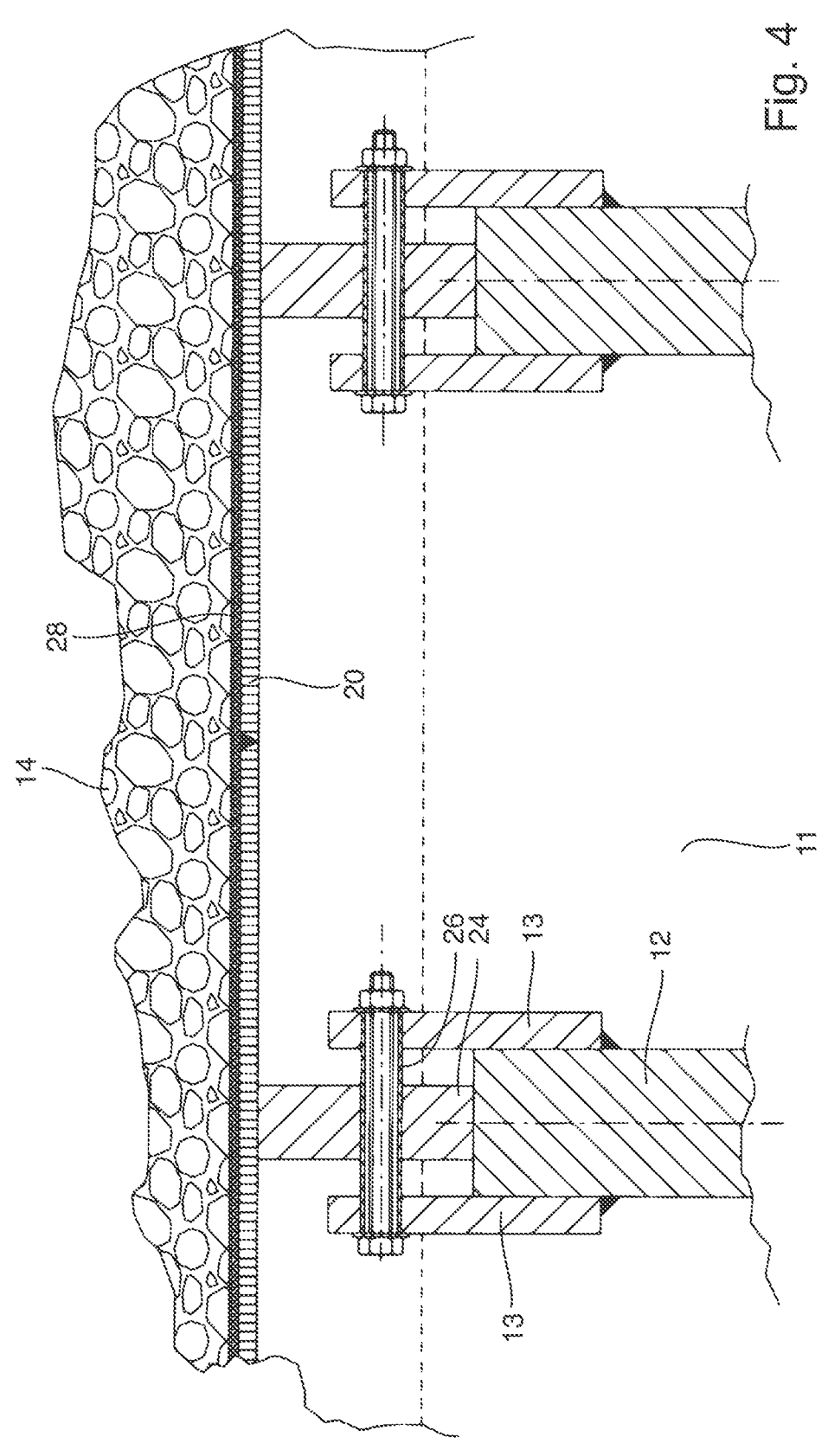
FIG. 4 is an enlarged detail view showing a vertical section through the view of FIG. 3 along the line A-A.

Further details relating to the floating mounting of the support elements 24 are apparent from the illustration of FIG. 4 which shows a view in the direction of arrow A of FIG. 3 and thus a detail view in the longitudinal direction of the reactor vessel 10 and which is referred to below. Apparent in FIG. 4 are two of the brackets 12 of the carrier structure which are each enclosed on both sides by two cheeks 13 which are in turn fixedly joined to the brackets 12. These cheeks 13 extend parallel to the brackets 12 and are fixedly joined to the brackets, for example by a weld. The cheeks 13 respectively laterally flank the brackets 12 on both sides and extend beyond these in the upward direction. The brackets 12 extend radially outward towards the wall 11 of the reactor vessel and are fixedly joined thereto, as shown in FIG. 3. It is apparent from FIG. 4 that the brackets 12, on which the support elements 24 floatingly rest, are wider than the support elements 24 themselves. The sleeves 26 extend transversely to the support elements 24, extend through the support elements 24 and the two cheeks 13 and are fixed to the cheeks 13 via a screw connection for example. Since the support elements 24 which rest on the brackets 12 are narrower than the brackets they can also move in the transverse direction relative to the brackets, guided by the sleeves 26, to achieve a floating mounting of the support elements 24 resulting in two degrees of freedom of motion, namely in the transverse direction and in the longitudinal reaction toward the reactor wall (see double arrow 25 in FIG. 3). The cheeks 13 prevent the support elements 24 from slipping off the brackets 12 on which they rest in the event of excessive motion in the transverse direction.

The sieve plate 20 in turn rests on the top surface of the support elements 24, in each case bridging the distance between two adjacent support elements 24, as is apparent from FIG. 4. The sieve plate 20 rests loosely on the support elements and is thus also floatingly mounted. At its outer end, viewed in the transverse direction of the reactor vessel (see FIG. 3), the sieve plate 20 is enclosed between the circumferential carrier element 22 and the cover plate 23 and floatingly mounted. Viewed in the longitudinal direction of the reactor vessel 10 the sieve plate 20 likewise terminates before the wall of the reactor vessel so that here too there is clearance in the case of thermal expansion of the sieve plate 20, Resting on the sieve plate 20 is initially a wire mesh 28 (see FIGS. 3 and 4), the catalyst bed 14 then in turn resting thereupon.

The catalyst bed 14 may have a bed of ceramic beads applied atop it which is intended to compensate any non-uniform settling of the catalyst bed and prevent fluidization of the catalyst by the gas stream.

Alternatively, or optionally in addition, a grating with wire mesh attached below it may be placed directly on the catalyst bed 14 or on the ceramic beads. These serve as a hold-down for the catalyst bed and the use of gratings can additionally achieve gas flow alignment (the gas cannot flow transversely into the catalyst bed, only vertically through the grating).

Figure 5:
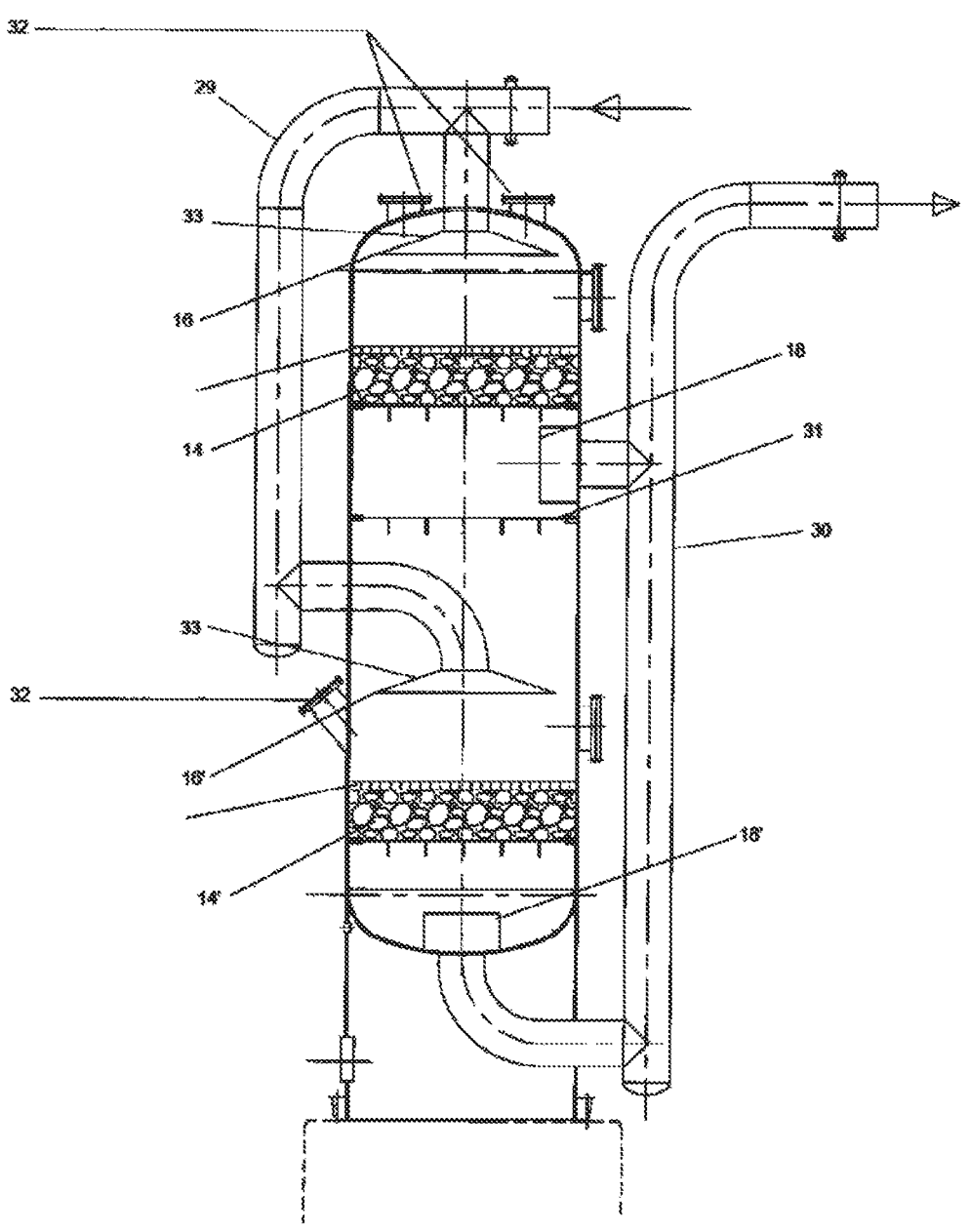
FIG. 5 is a schematic view of an exemplary embodiment of a reactor having two catalyst beds.

FIG. 5 shows an embodiment of a reactor vessel 10 having a first catalyst bed 14 and a second catalyst bed 14'. The reactor vessel 10 is a dual-flow reactor. Via a first inlet 16, a portion of the gas stream can flow through the first catalyst bed 14 and exits the reactor vessel 10 through a first outlet 18. Via a second inlet 18 a further portion of the gas stream can flow through the second catalyst bed 14' and exits the reactor vessel 10 through a second outlet 18' The first inlet 16 and the second inlet 16' are fluidically connected to one another via an inlet manifold 29. The gas stream is divided inside the inlet manifold 29 so that both the first catalyst bed 14 and the second catalyst bed 14' are flown through.

The first outlet 18 and the second outlet 18' are fluidically connected to one another by means of an outlet manifold 30, The gas stream passed through the first catalyst bed and the gas stream passed through the second catalyst bed are recombined via the outlet manifold 30. The two catalyst bed 14, 14' are also fluidically separated from one another by means of a separating element 31 in the form of a separating plate. This makes it possible to avoid bypass flows. The two catalyst beds 14, 14' are therefore connected in parallel, wherein respective portions of the gas stream are passed through the first catalyst bed 14 and the second catalyst bed 14' respectively.

Access to the assembly and filling of the catalyst beds 14, 14' with catalyst is carried out via manholes and, in this exemplary embodiment, via filling port 32. Used catalyst can also be replaced, in particular removed by suction, via filling port 32. The gas flow is uniformly distributed in the reactor vessel 10 via gas distributors 33.

LIST OF REFERENCE NUMERALS

10 Reactor vessel
11 Wall of reactor vessel, reactor wall
12 Brackets, carrier elements
13 Cheeks
14 (First) catalyst bed
14' Second catalyst bed
15 Axis
16 First inlet
16' Second inlet
17 Deflection plate
18 First outlet
18' Second outlet
19 Stiffening ribs
20 Sieve plate
21 Edge gap
22 Carrier element
23 Cover plate
24 Support elements
25 Double arrow 26 Sleeve, spacer element
27 Slot, elongate hole
28 Wire mesh
29 Intake manifold
30 Outlet manifold
31 Separating element
32 Filling port
33 Gas distributor

What is claimed is:

1. A reactor for catalytic treatment of residual gas for reducing a content of nitrogen oxides in processes for producing nitric acid by the Ostwald process, comprising:
   a catalyst bed for catalytic treatment of a gas stream, wherein the catalyst bed extends substantially over a cross section of the reactor and the catalyst bed is axially flown through by gas to be treated; and
   a carrier structure for the catalyst bed that is at least partly floatingly mounted in the reactor, wherein the carrier structure comprises:
   a sieve element,
   radially outwardly, carrier elements fixedly joined to a reactor wall below the sieve element, wherein the sieve element provides a resting surface for the catalyst bed, wherein the sieve element terminates, radially outwardly, at a distance from the reactor wall, and
   support elements for the sieve element that are floatingly mounted in the reactor;
   wherein the carrier elements fixedly joined to the reactor wall include brackets on which the support elements displaceably rest;
   wherein the sieve element rests on the displaceable support elements.

2. The reactor of claim 1 wherein two or more of the brackets are respectively spaced apart from one another in a longitudinal direction or in a circumferential direction of the reactor, wherein the support elements displaceably rest on the two or more of the brackets, wherein the sieve element rests on one or more of the support elements.

3. The reactor of claim 1 wherein the support elements displaceably rest on the brackets with two degrees of freedom of motion in two directions approximately perpendicular to one another.

4. The reactor of claim 3 wherein the support elements rest on the brackets such that the support elements are displaceable in a longitudinal direction of the brackets and in a transverse direction of the brackets.

5. The reactor of claim 1 wherein the brackets are wider in a transverse direction of the brackets than the support elements.

6. The reactor of claim 1 wherein the support elements terminate at a distance from the reactor wall.

7. The reactor of claim 1 wherein cheeks are mounted to the brackets such that the cheeks limit displaceable motion of the support elements relative to the brackets in a transverse direction of the brackets.

8. The reactor of claim 7 wherein in each case two parallel cheeks of the cheeks are spaced apart from one another and are mounted on both sides of the brackets, wherein the two parallel cheeks are joined to one another via a spacer element extending in a transverse direction.

9. The reactor of claim 8 comprising a sleeve that is force-locked connected to the two parallel cheeks as the spacer element.

10. The reactor of claim 8 wherein each support element comprises a slot and extends through a slot transverse to the support element.

11. The reactor of claim 1 wherein the carrier structure comprises a carrier element circumferentially arranged at the reactor wall and jointed thereto, wherein the sieve element floatingly rests on the carrier element at a distance from the reactor wall such that an edge gap between the sieve element and the reactor wall remains.

12. The reactor of claim 1 comprising a circumferential cover plate that covers an edge gap between the sieve element and the reactor wall.

13. The reactor of claim 12 wherein an edge region of the sieve element that faces the reactor wall is enclosed by the circumferential cover plate and a carrier element of the carrier structure that is circumferentially arranged at the reactor wall and jointed thereto.

14. The reactor of claim 1 configured as:

a horizontal reactor where the residual gas flows through the catalyst bed substantially perpendicularly or transversely to a vessel axis, or a vertical reactor where the residual gas flows through the catalyst bed substantially in an axis direction or parallel to a vessel axis.

15. The reactor of claim 1 comprising stiffening ribs that are approximately vertically oriented, extend along the sieve element, and are spaced apart from one another, with the stiffening ribs being disposed above or below the sieve element in the catalyst bed.

16. The reactor of claim 1 wherein the catalyst bed is a first catalyst bed, the reactor comprising a second catalyst bed, wherein the catalyst beds are spaced apart from one another, wherein at least a portion of the gas stream flows via a first inlet to the first catalyst bed, wherein at least a portion of the gas stream flows via a second inlet to the second catalyst bed.

17. The reactor of claim 16 wherein the first inlet and the second inlet are fluidically connected to one another via an inlet manifold.

18. The reactor of claim 16 wherein at least a portion of the gas stream is dischargeable from the reactor via a first outlet in a region of the first catalyst bed, wherein at least a portion of the gas stream is dischargeable from the reactor via a second outlet in a region of the second catalyst bed.

19. The reactor of claim 18 wherein the first outlet and the second outlet are fluidically connected to one another via an outlet manifold.

20. The reactor of claim 16 wherein the first catalyst bed and the second catalyst bed are fluidically separated from one another by a separating element.

\*  \*  \*  \*  \*